(12) United States Patent
Wright et al.

(10) Patent No.: US 6,709,070 B1
(45) Date of Patent: Mar. 23, 2004

(54) UNIDIRECTIONAL STABILITY CHOKE FOR A BRAKE CONTROL VALVE

(75) Inventors: Eric C. Wright, Evans Mill, NY (US); Robert P. Gayfer, Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 10/441,219

(22) Filed: May 20, 2003

(51) Int. Cl.[7] .................................................. B60T 17/06
(52) U.S. Cl. .............................. 303/81; 303/38; 303/86
(58) Field of Search .......................... 303/81, 900, 30, 303/39, 38, 37, 35, 28, 29, 40, 86; 137/613; 188/152

(56) References Cited

U.S. PATENT DOCUMENTS

| | | | |
|---|---|---|---|
| 5,044,698 A | 9/1991 | Hart et al. | 303/33 |
| 5,387,030 A | 2/1995 | Gayfer et al. | 303/900 |

*Primary Examiner*—Douglas C. Butler
(74) *Attorney, Agent, or Firm*—Barnes & Thornburg

(57) ABSTRACT

A service portion of a rail pneumatic brake control valve which includes a piston responsive to pressure differential between brake pipe pressure at a brake pipe port and reservoir pressure at a reservoir port and a first valve controlled by the piston to determine pressure in a brake cylinder for a service application. A stability choke and check valve are connected in series between the brake pipe port and the reservoir port. The check valve permits flow from the brake pipe port to the reservoir port and prevents flow from the reservoir port to the brake pipe port independent of the piston.

14 Claims, 4 Drawing Sheets

UNIDIRECTIONAL STABILITY CHOKE FOR A BRAKE CONTROL VALVE

BACKGROUND AND SUMMARY OF THE INVENTION

The present invention relates generally to brake control valve systems for operating a rail vehicle's air brakes, in response to brake pipe pressure in a brake pipe, and more specifically to the service portion of a brake control valve system.

Brake control valve systems for a vehicle having air brakes generally include a brake control valve responsive to the brake pipe pressure in a brake pipe to operate the brakes of a vehicle. For a reduction of brake pipe pressure, the brakes are proportionally applied. For an increase in brake pipe pressure, the brakes may be released totally or gradually. In the AAR system, the brake control valves include a service section and an emergency section which are responsive respectively to a service rate of reduction and emergency rate of reduction to apply the brakes appropriately. Each section includes a separate diaphragm or piston responsive to the brake pipe pressure on one side and a reference pressure on the other. Not only must the brake control valve differentiate between a service and an emergency application, but it must also react in a specific amount of time to apply the brakes and propagate the signal throughout the brake system. A prior art control valve is a DB60 available from New York Air Brake Corporation. The structure is also exemplified by European Patent EP-A-328 755.

Historically, the control valves have been designed to be substantially insensitive to pneumatic noise signals in the brake pipe which could cause undesired emergency (UDE) braking and undesired release (UDR). Various mechanisms have been used, for example, chokes or restrictions interconnecting the brake pipe and the reference chamber of the diaphragms, to accommodate pneumatic noise. Some of the pneumatic noise or shock is produced by the mechanical vibration of the vehicle. One solution to accommodate mechanical vibration is discussed in U.S. Pat. No. 5,387,030.

Historically, AAR-type control valves have included a small stability choke, also known as a "weeper port," providing communication between the auxiliary reservoir and the brake pipe. The weeper port was included in the ABD control valve when developed in 1963 to provide the stability which previously resulted from leakage across the metal ring seals of the previous generation of AB control valves. The new ABD had an air-tight, rubber diaphragm. The weeper port provides stability during brake application by preventing undesired brake release due to slow auxiliary reservoir leakage or minor fluctuations in brake pipe. In addition, it negated the slow brake cylinder pressure increase occurring over a period of several minutes, also know as brake cylinder "pressure creep." The pressure creep results from the warming of the auxiliary reservoir and its resultant pressure increase after an essentially adiabatic pressure reduction. This chilling and subsequent pressure increase of an air reservoir resulting from rapid pressure reduction and the corresponding warming and pressure loss resulting from rapid pressure increase are known commonly as the "temperature effect."

Today, with the advent of modern precision locomotive brake controls, like the CCB (Computer Controlled Brake) manufactured by NYAB and the digital pressure displays in the cab of the locomotive, the locomotive engineer has the ability to control brake pipe pressure reductions and see the result on the display screen with 1 psi accuracy. The improvements in the locomotive brake control technology have resulted in the need for corresponding improvement in the performance of the brake control valve. When a 1 or 2 psi split reduction is made, with dwell times greater than 2–3 minutes between reductions, the weeper port allows auxiliary reservoir air to flow to the brake pipe as the auxiliary reservoir pressure increases due to the temperature effect. The control valve is thus desensitized by the amount of the auxiliary pressure increase, which can be shown to be 0.5–0.6 psi. This translates to approximately 1.25 to 1.5 psi of brake cylinder pressure development. Or stated another way, for small split reductions with long dwell times between the reductions, a control valve with a weeper port will develop 1.25 to 1.5 psi less brake cylinder pressure for each small (1–2 psi) brake pipe reduction than a control valve which does not have a weeper port.

For larger brake pipe reductions, the "loss" of brake cylinder pressure is small compared to the resulting brake pressure achieved and is not apparent to the locomotive engineer. The performance difference is most visible on long grade braking where, after the initial reduction, several very small split reductions are made over a long period of time. Each split reduction results in a brake cylinder pressure 1.25–1.5 psi lower than anticipated, which is a significant fraction of the brake pressure expected for that brake pipe reduction.

Therefore, the invention provides a uni-directional stability port in the weeper function, which will prevent the flow from auxiliary reservoir to the brake pipe during pressure increase of auxiliary reservoir from the temperature effect. Thus, the pressure increase of the auxiliary reservoir from heating up results in re-application of the control valve to increase the brake cylinder pressure by an amount proportional to that auxiliary reservoir pressure increase. On the other hand, the invention provides communication between the brake pipe and auxiliary reservoir when the brake pipe pressure is greater than the auxiliary reservoir pressure. This might occur when auxiliary reservoir is subject to a leak, or when brake pipe pressure fluctuates as a result of any one of several well-known causes. Thus, undesired brake releases are prevented.

The service portion of a rail pneumatic brake control valve of the present invention includes a piston responsive to pressure differential between brake pipe pressure at a brake pipe port and reservoir pressure at a reservoir port and a first valve controlled by the piston to determine pressure in a brake cylinder for a service application. A stability choke and check valve are connected in series between the brake pipe port and the reservoir port. The check valve permits flow from the brake pipe port to the reservoir port and prevents flow from the reservoir port to the brake pipe port independent of the piston.

The service portion further includes a charging choke and charging valve in series between the brake pipe port and the reservoir port. The charging valve is controlled by the piston. The stability choke has a greater restriction than the charging choke. The check valve opens for a pressure differential smaller than the differential pressure on the piston which opens the charging valve.

Other objects, advantages and novel features of the present invention will become apparent from the following detailed description of the invention when considered in conjunction with the accompanying drawings.

DETAILED DESCRIPTION OF THE DRAWINGS

Figure 1:
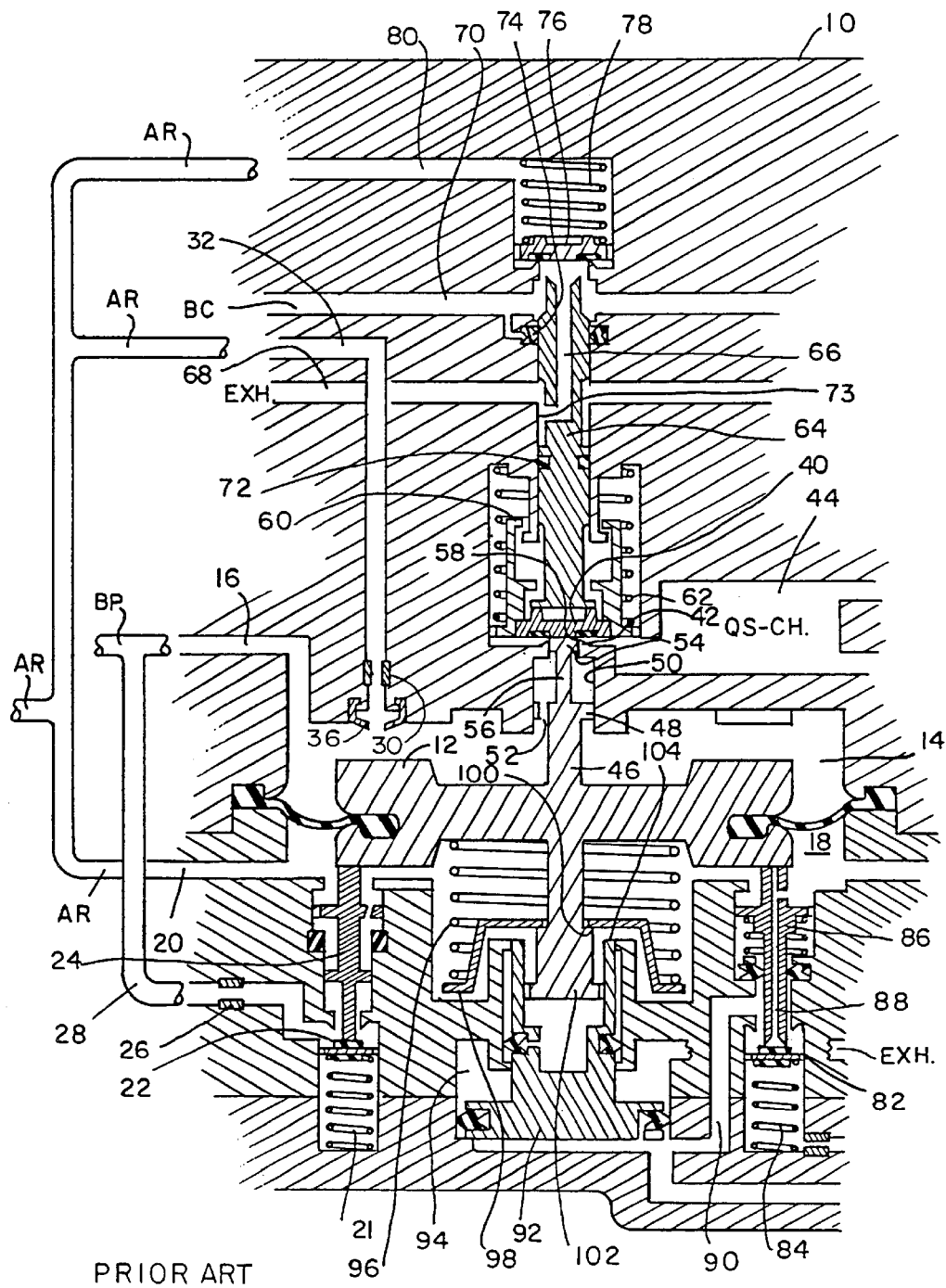
FIG. 1 is a schematic view of a portion of a service portion of a brake control valve in the charging lap/released position according to the prior art.

The present invention is being described with respect to an improvement on a DB-60 control valve available from New York Air Brake, a unit of Knorr Brake Holding Corporation, of Watertown, N.Y. A detailed description of the complete DB-60 control valve is found in instruction manual MU-21 available from New York Air Brake. Although the improvement has been incorporated into the service section of the DB-60, the present improvement may be provided to any brake control valve portion which includes a piston responsive to brake pipe pressure on one side and a reservoir as the source of brake cylinder pressure on the other side of the diaphragm. Thus, the invention may be used in other AAR-styled brake control valves or non-AAR brake control valves. Only those portions of the service section of the DB-60 which explain the operation of the present invention have been included in the schematics and others have been intentionally deleted for sake of clarity. The numerals are the same as that in U.S. Pat. No. 5,387,030, which should be referred to for fuller explanation of the operation of the service portion. The present invention can be used on a service portion without the improvement in the aforementioned patent.

The brake control valve includes a housing 10 having a service piston or diaphragm 12 with brake pipe pressure in the top chamber 14 connected to the brake pipe BP by passage 16. The bottom chamber 18 on the other side of the piston 12 is connected to the auxiliary reservoir AR through passage 20. An auxiliary reservoir charging valve 22 is controlled by the piston 12 through operator 24 and includes spring 21. The auxiliary reservoir charging valve 22 is connected to the brake pipe BP by sensitivity choke 26 in passage 28. A stability choke 30 or weeper port connects the brake pipe chamber 14 on the top of diaphragm 12 to the auxiliary reservoir AR by passage 32. The stability choke 30 has a smaller opening or greater restriction than the sensitivity choke 26. Whereas the sensitivity choke 26 interconnects the two chambers 14 and 18 of the piston 12 (as long as the auxiliary reservoir charging valve 22 is open), the stability choke 30 interconnects the two chambers 14, 18 for all service positions of the service piston 12. The connection through the stability choke 30 is closed off in the emergency position of the service piston 12 by the service piston engaging gasket 36. The restrictions 26 and 30 define the sensitivity of the service position 12 against pneumatic noises in the brake pipe.

A quick service inlet valve 40 includes a seat 42 and connects the top or brake pipe chamber 14 of piston 12 to the quick service chamber 44. Operator 46, extending from the service piston 12, includes a guide portion 48 moving within bore 50 of the housing. A passage 52 in the guide 48 connects the brake pipe chamber 14 of the piston 12 to the bore 50. A smaller bore 58 connects bore 50 to the valve seat 42. The operator 46 includes an actuator having a first portion 54 of a first cross-sectional area and a second contiguous portion 56 of a second cross-sectional area smaller than the first cross-sectional area 54. The first portion 54 engages the quick service inlet valve 40. Portions 54 and 56 define restrictions between themselves and the bore 58. The restriction formed by 54 is sufficiently small so as to minimize the flow to the quick service chamber 44, whereas the restriction formed between bore 58 and portion 56 permits a flow rate to provide normal operation of the quick service inlet valve 40.

A spring cage 60 connects a spring 62 to the quick service inlet valve 40 and biases it closed. A slide 64 is operatively connected to the quick service inlet valve 40 and includes a passage 66, which in the FIG. 1 condition connects exhaust EXH through passage 68 in the housing to the brake cylinder by passage 70 in the housing. O-ring 72 and K-ring 74 on the slide 64 seals the slide in the bore 73 of the housing. A brake cylinder inlet valve 76 including spring 78 connects the brake cylinder passage BC 70 to the auxiliary reservoir via passage 80. The slide 64 operates the brake cylinder valve 76 in response to the quick service inlet valve 40.

A balancing valve 82 with spring 84 includes an operator 86 which is controlled by the service piston 12. A passage 88 in the operator 86 connects the auxiliary reservoir chamber 18 at the bottom of service piston 12 to a balancing piston 92 via passage 90 when the balancing valve 82 is closed and passage 88 is opened. The balancing piston 92 has chamber 94 on its top side connected to exhaust EXH. A spring 96 resting on spring cage 98 biases the service system 12 towards its braking position. The spring cage 98 rests on shoulder 100 of an element 102 connected to the service piston 12. An extension 104 of the balancing piston 102 will engage the spring cage 98 to change the biasing of the spring 96.

Except for the modification of the first portion 54 of the operator 46 to form a restriction smaller than the restriction formed by portion 56, the control valve portions described are that of the prior art described as the DB-60 control valve. In the charging lap position of FIG. 1, the auxiliary reservoir charging valve 24 is open and the balancing valve 82 is open with the passage 88 blocked. The first portion 54 lies in bore 58, and the quick service inlet valve 40 and the brake cylinder inlet valve 76 are closed. Passage 66 is open connecting the brake cylinder passage 70 to the exhaust passage 68. Both the sensitivity choke 26 and the stability choke 30 are operative.

For service application, the brake pipe pressure chamber 14 drops causing the piston 12 to move up. This closes the auxiliary reservoir charging valve 24 and the balancing valve 82. This disconnects the auxiliary reservoir AR from the brake pipe BP. The movement of the service piston 16 cuts off passage 66 against inlet valve 76 cutting off the brake cylinder BC from exhaust passage 68. Further movement will open brake cylinder inlet valve 76 connecting the auxiliary reservoir passage 80 to the brake cylinder passage 70 applying appropriate pressure to the brake cylinder BC. Once the drop of pressure in the auxiliary reservoir in chamber 18 matches the drop in pressure of the brake pipe in chamber 14, the service piston 12 will move back to a balanced position. This will allow brake cylinder inlet valve 76 to close on its seat but maintain the passage 66 closed. This lap position of the valves retains the pressure in the brake cylinder.

To release the brake, the brake pipe pressure is increased in chamber 14 moving the service piston 12 down. This opens passage 66 off the brake cylinder inlet valve 76 connecting brake cylinder passage 70 to exhaust passage 68. The auxiliary reservoir charging valve 24 is open, as is the balancing valve 82. This charges the auxiliary reservoir with the brake pipe pressure. Once the auxiliary reservoir and brake pipe pressure are equal, they will assume the positions shown in FIG. 1.

To address the reduction or loss of brake cylinder pressure produced by one or two pounds split reduction, with dwell times greater than 2–3 minutes between reductions, a check valve is provided in series with the stability choke 30. The check valve permits flow from the brake pipe chamber 14 to the auxiliary reservoir AR and prevents flow of pressure from the auxiliary reservoir AR to the brake pipe chamber 14. The operation of the check valve is independent of the operation of the service piston 12.

Figure 2:
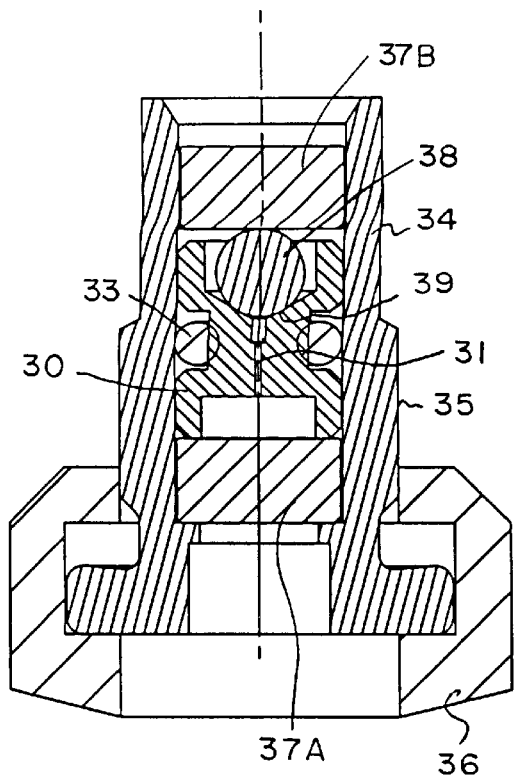
FIG. 2 is blown-up view of a stability choke and check valve according to the principles of the present invention with a standard gasket.
Figure 3:
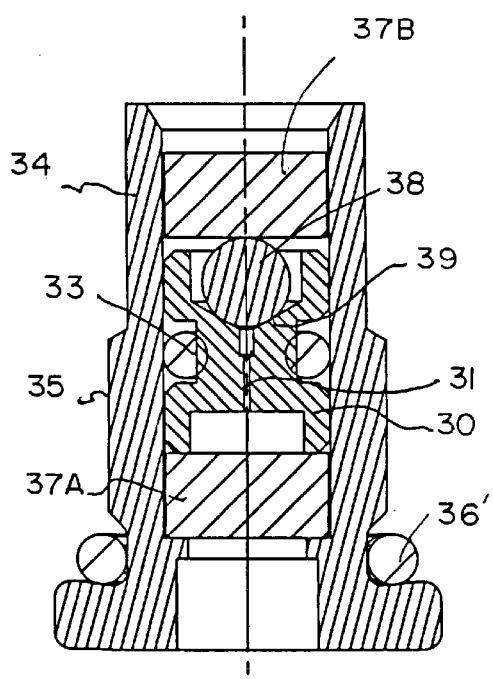
FIG. 3 is blown-up view of a stability choke and check valve according to the principles of the present invention with an o-ring.

A detailed description of the combined stability choke 30 and check valve is illustrated in FIGS. 2 and 3. The stability choke 30 has a body with a restriction 31 therein. The choke 30 is received in a housing 34 and sealed thereto by O-ring 33. The housing 34 includes a threaded portion 35, which is received in passage 32 of the service portion. A gasket 36 is provided to seal the threading 35 of the housing 34 with passage 32. Gasket 36 also wraps around the front end of the housing 34 and provides a valve seat for the service piston 12 in an emergency condition of the service piston 12. A pair of filters 37A, 37B are provided in the bore of the housing 34 on both sides of the choke 30. This filters air in both directions. In the prior art, the top and bottom filters 37A, 37B were the same material. The description of the choke 30 so far is that of the prior art.

The improvement is a check valve 38 resting on a seat 39 in the top portion of the choke 30. The check valve 38 opens when the pressure in brake pipe chamber 14 is greater than that of the auxiliary reservoir pressure in passage 32 and prevents flow in the opposite direction. To provide a minimum bias on the check valve 38 towards seat 39, the filter 37B is replaced with an open cell foam material. This offers a minimum biasing, as well as acting as a filter material. The check valve 38 will unseat for pressure differential of less than or equal to one pound per square inch. The effect of the check valve 38 is to basically remove the restriction 31 during the operation of the service braking while allowing it to be a portion of the stability during release of the brakes and charging of the auxiliary reservoir. Removing the stability choke 30 during the service braking prevents the temperature effect during service braking from reducing the desired brake cylinder pressure.

FIG. 3 shows a modification of FIG. 2. The gasket 36 has been replaced by an O-ring 36'. O-ring 36' provides a seal between the bore 32 and the threaded portion 35 of the housing 34. Because the check valve 38 is closed during an emergency braking or emergency position of the service piston 12, there is no need to create a seat for the emergency position. Thus, gasket 36 can be replaced by O-ring 36'.

Figure 4:
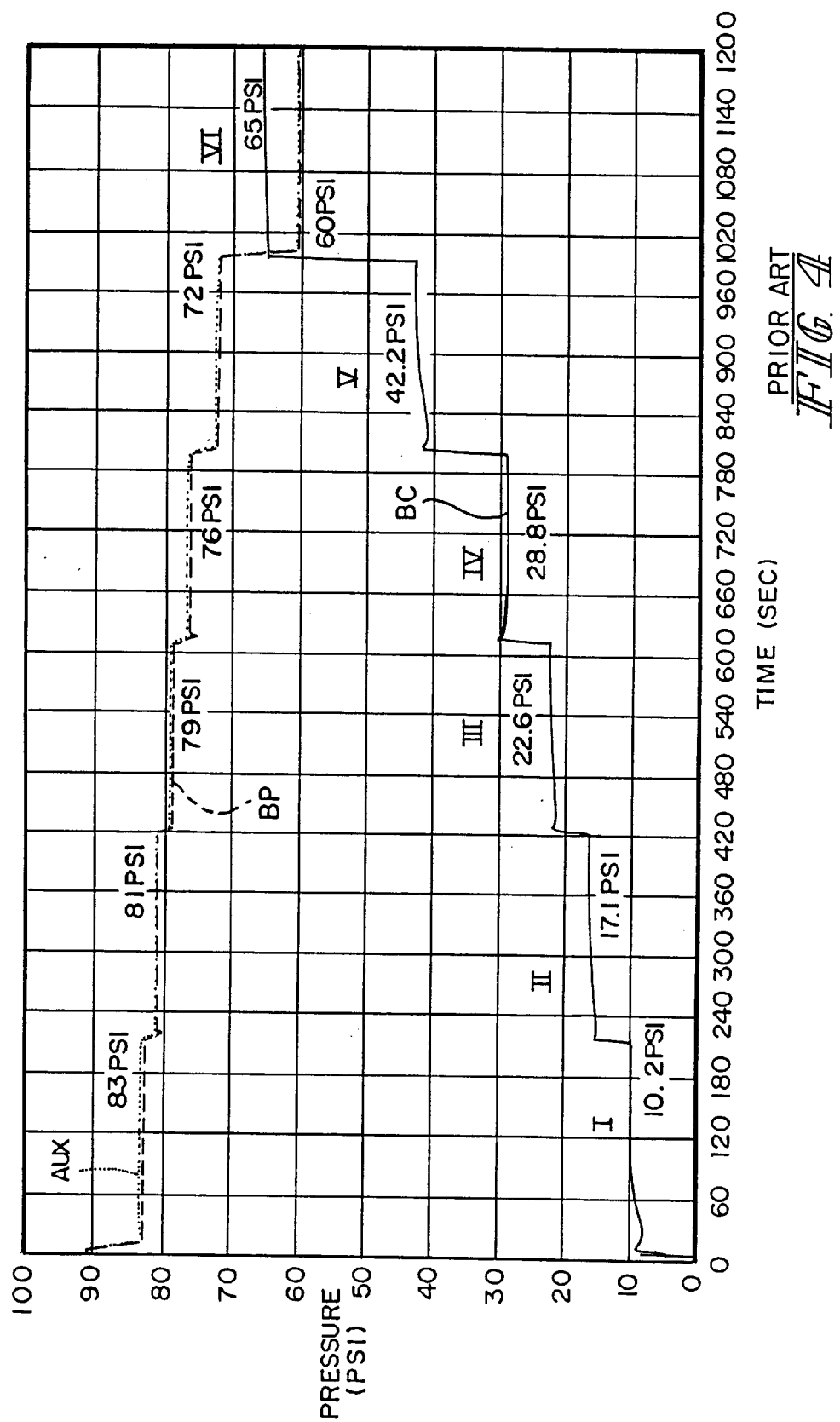
FIG. 4 is a graph of brake pipe, auxiliary reservoir and brake cylinder pressures as a function of time for split reductions for the prior art DB-60 service portion.
Figure 5:
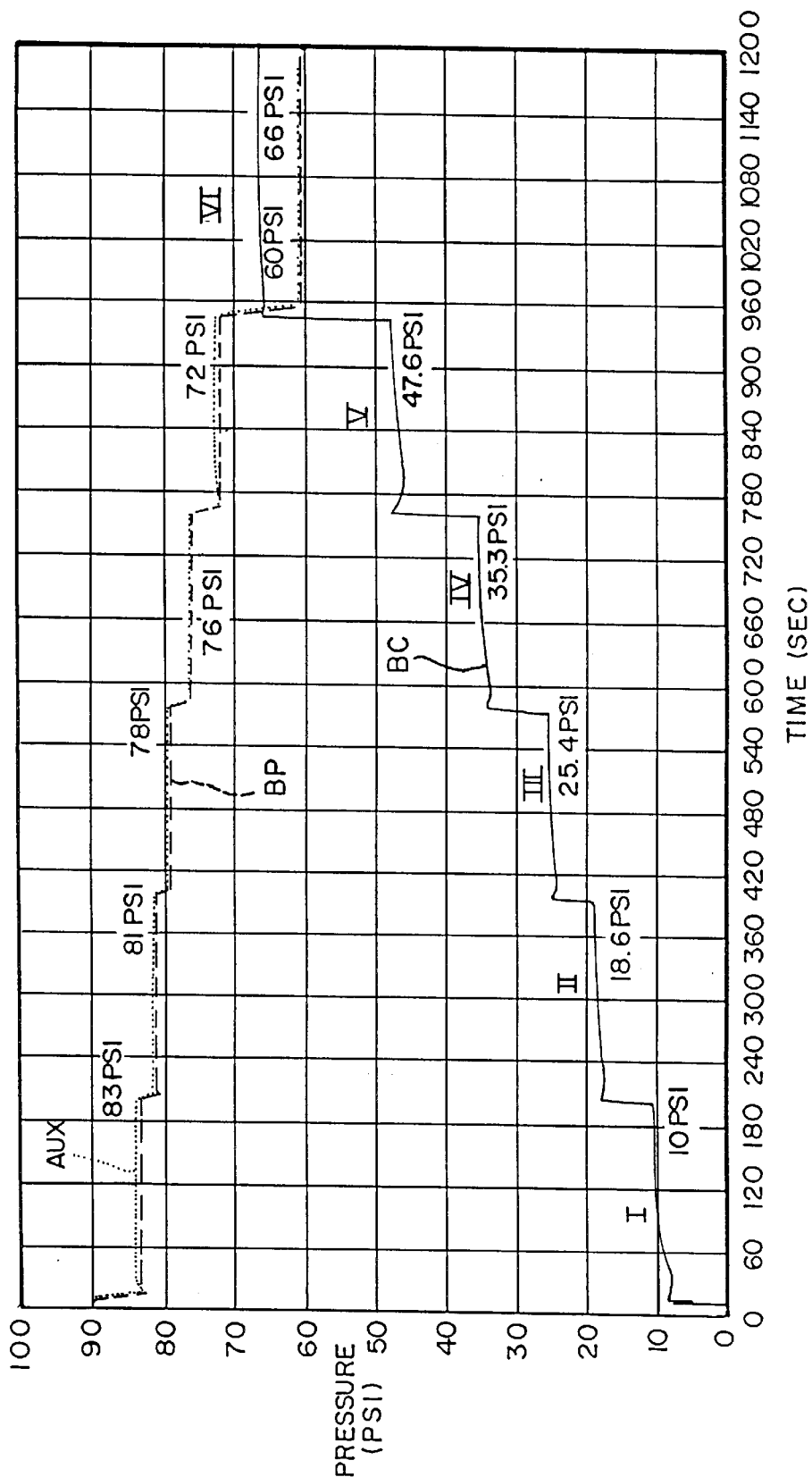
FIG. 5 is a graph of brake pipe, auxiliary reservoir and brake cylinder pressures as a function of time for split reductions for the DB-60 service portion of the present invention.

The effect of the check valve of the present invention can be seen from comparing FIGS. 4 and 5. Each of them show the brake pipe pressure, auxiliary pipe pressure and brake cylinder pressure as a function of time for split reductions. The brake pipe reductions are separated by 2–3 minutes and a reduction of 2–4 pounds. In both graphs, the auxiliary reservoir fluctuates over this period for a substantially constant brake pipe reduction.

The brake cylinder pressure in both graphs show an initial spike for the initial reduction but with a different response thereafter. A comparison of the results of the two curves is illustrated in Table 1 below.

TABLE 1

| BRAKE NUMBER | BP REDUCTION | CHOKE | CHOKE/ CHECK | DIFFERENCE |
| --- | --- | --- | --- | --- |
| I | 7 | 10.2 | 10.2 | 0 |
| II | 2 | 17.1 | 18.6 | 1.5 |
| III | 2 | 22.6 | 25.4 | 2.8 |
| IV | 3 | 28.8 | 35.3 | 6.5 |
| V | 4 | 42.2 | 47.6 | 5.4 |
| VI | 12 | 65 | 66 | 1 |

The loss of brake cylinder pressure is illustrated in the last column. For the first reduction of seven pounds, the effect is basically zero differential. The smaller braking in Brake Nos. II–IV show reduced brake pipe pressure of 1.5–6.5. This is an accumulative effect. For the 4-pound reduction for Brake No. V, it reduces the difference of 5.4, while a 12-pound reduction in Brake No. VI brings them close to basically a one-pound difference. As discussed previously, if there is no split reduction of 1–2 pounds separated by 2–3 minutes, the thermal effect has no significant effect, and the desired full brake cylinder pressure is achieved.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A service portion of a rail pneumatic brake control valve comprising:
    a piston responsive to pressure differential between brake pipe pressure at a brake pipe port and reservoir pressure at a reservoir port;
    a first valve controlled by the piston to determine pressure in a brake cylinder for a service application;
    a stability choke connected between the brake pipe port and the reservoir port; and
    a check valve in series with the stability choke for permitting flow from the brake pipe port to the reservoir port and preventing flow from the reservoir port to the brake pipe port independent of the piston.

2. The service portion according to claim 1, including a charging choke and charging valve in series between the brake pipe port and the reservoir port, and the charging valve is controlled by the piston.

3. The service portion according to claim 2, wherein the stability choke has a greater restriction than the charging choke.

4. The service portion according to claim 2, wherein the check valve opens for a pressure differential smaller than the differential pressure on the piston which opens the charging valve.

5. The service portion according to claim 1, wherein the check valve includes a valve element retained on a seat by a resilient element, and the resilient element is an open cell foam material.

6. The service portion according to claim 1, wherein the check valve opens for a pressure differential of less than or equal to one pound per square inch.

7. The service portion according to claim 1, wherein the check valve and the stability choke are in a common housing and the housing is screwed in to passage in the service portion.

8. A rail pneumatic brake control valve including a service portion, the service portion comprising:

a piston responsive to pressure differential between brake pipe pressure at a brake pipe port and reservoir pressure at a reservoir port;

a first valve controlled by the piston to determine pressure in a brake cylinder for a service application;

a stability choke connected between the brake pipe port and the reservoir port; and a check valve in series with the stability choke for permitting flow from the brake pipe port to the reservoir port and preventing flow from the reservoir port to the brake pipe port independent of the piston.

9. The control valve according to claim 8, including a charging choke and charging valve in series between the brake pipe port and the reservoir port, and the charging valve is controlled by the piston.

10. The control valve according to claim 9, wherein the stability choke has a greater restriction than the charging choke.

11. The control valve according to claim 9, wherein the check valve opens for a pressure differential smaller than the differential pressure on the piston which opens the charging valve.

12. The control valve according to claim 8, wherein the check valve includes a valve element retained on a seat by a resilient element, and the resilient element is an open cell foam material.

13. The control valve according to claim 8, wherein the check valve opens for a pressure differential of less than or equal to one pound per square inch.

14. The control valve according to claim 8, wherein the check valve and the stability choke are in a common housing and the housing is screwed in to passage in the service portion.

* * * * *